July 25, 1939.   H. JACOBS   2,167,512
ELECTRICAL OSCILLATORY CIRCUITS
Filed Oct. 15, 1937
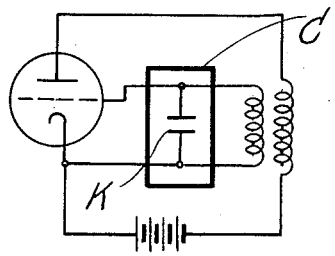
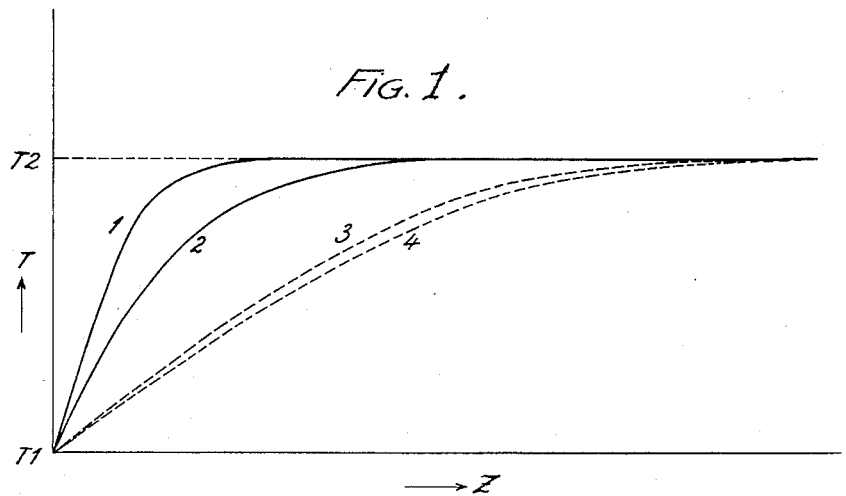
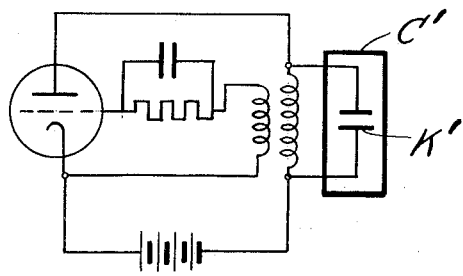
Inventor:
Hans Jacobs
by R. O. Hopgood
Attorney Patented July 25, 1939

2,167,512

UNITED STATES PATENT OFFICE 2,167,512

ELECTRICAL OSCILLATORY CIRCUITS

Hans Jacobs, Berlin-Mariendorf, Germany, assignor to C. Lorenz Aktiengesellschaft, Berlin-Tempelhof, Germany, a company Application October 15, 1937, Serial No. 169,245
In Germany October 27, 1936

6 Claims. (Cl. 250—40)

The present invention relates to oscillatory circuits, and more particularly to a method for obtaining frequency constancy in such circuits.

It is well known that temperature variations tend to shift the natural frequency of oscillatory circuits. Such shifts are very undesirable in connection with radio transmitters, and means have therefore been proposed in order to obtain a suppression of the influences which temperature changes generally exert upon the natural frequency. For example, propositions have been made to place an oscillatory circuit in a closed container maintained at a constant temperature, but the heating equipment for the container in combination with the heat regulating means necessary in such an arrangement involve considerable expenditure. Therefore attempts have been made to reduce the effect of temperature in such a manner that one element of the oscillatory circuit shall be influenced in a frequency increasing sense, while the other element, or elements shall be influenced in a frequency decreasing sense by temperature variations, so as to obtain a mutual compensation between these effects. However, the desired frequency constancy was not yet attained.

According to the present invention, the solution of the last mentioned problem is based upon the comprehension, that a compensation between the temperature effects with respect to the two elements of the oscillatory circuit, i. e., their changes in dependence on temperature, which occurs at each temperature after the elapse of a longer period of time, is insufficient for securing the desired results, but that each such temperature effect must be the same for both elements.

The invention will be more readily understood from the following description in conjunction with the attached graphical illustration.

Fig. 1 shows a series of curves explanatory of the invention; Figs. 2 and 3 are schematic diagrams of typical oscillation circuits employing features of the invention.

In Fig. 1 of the drawing, the horizontal axis Z represents time, while the vertical axis T indicates temperature. It is assumed in the present case that the temperature of the container enclosing the oscillatory circuit is caused to rise by any reason from the value $T_1$ to $T_2$. The curve 1 relates to a condenser which due to its relatively high heat conductance more quickly assumes the temperature of the container, while the curve 2 shows the temperature change of a coil located in the same container. These curves which are valid for a temperature rise as well as for a temperature drop thus demonstrate that the two elements present different momentary temperatures during the temperature change within the container. An accurate compensation will consequently not be realized, as such a balance requires exactly equal temperatures of both elements. The curves 1 and 2 represent a relatively rapid temperature change with regard to the surroundings, while the dotted curves 3 and 4 relate to a slow change with respect to the surrounding temperature. The latter curves substantially coincide, so that both elements of the oscillatory circuit have almost equal momentary temperatures.

The drawing also indicates the two possibilities for effecting the invention. The first possibility comprises the matching of the curve 1 to the curve 2, e. g., by encompassing the condenser by a substance, or by placing this condenser in a medium which acts to delay heat conduction. The second possibility is to artificially delay the duration of a temperature increase or decrease, effective from the exterior, i. e., to flatten the curves 1 and 2 in view of the curves 3 and 4. This may be achieved, e. g., by placing both elements of the oscillatory circuit in a receptacle, the walls of which perform a delayed heat conduction. Furthermore, each element may be located in a separate receptacle. In other words, a great number of different arrangements are available for securing the desired compensation, but the essential matter is in each case that both elements have exactly the same momentary temperatures during the entire period over which the surrounding temperature is subjected to variations.

Such substances may preferably be employed as heat conduction delaying materials, which have low dielectric losses if the cover is affected by the electric field of the oscillatory circuit. If not, the use of ceramic materials is preferred, which may be provided with a metal coating simultaneously serving for shielding purposes.

Fig. 2 shows a typical tuned grid type of feedback oscillator wherein the tuning condenser K is enclosed in a container C having the desired heat lag characteristics as above pointed out. Fig. 2 shows another wellknown type of oscillator wherein the plate circuit tuning condenser $K_1$ is enclosed within the container $C_1$ having the desired heat lag characteristics. It is obvious that the circuit elements must be so chosen that a temperature increment influences one circuit element, e. g., the coils in a frequency increasing sense and that the other element, e. g., the condenser, is simultaneously influenced in a frequency decreasing sense so that these two influences compensate each other in cases of a varying temperature so that the frequency remains constant. However, since it may occur that the condenser, for instance, more quickly follows the temperature change, it will be necessary in each and every moment to balance the temperature characteristic of each circuit element to the characteristic of the other element. This is accomplished according to the present invention by encompassing that circuit element which more quickly follows a temperature change in a material which delays heat conduction. This expedient not only secures a constant final temperature value and hence a constant frequency but also a frequency constancy in each and every moment during a temperature change.

What is claimed is:

1. The method of controlling the frequency-constancy of oscillating circuits of the type having a plurality of circuit elements which possess different temperature-lag characteristics, which comprises partially thermally insulating material those of said circuit elements which as compared with the other of said circuit elements have less heat lag so as to equalize the temperature conditions of all the circuit elements.

2. The method of controlling the frequency-constancy of an oscillatory circuit of the type having an inductance and a condenser which comprises partially thermally insulating said condenser so as to equalize the temperature conditions of both the condenser and the inductance.

3. An oscillatory system including frequency-determining circuit elements which have different temperature-lag characteristics, and enclosing means for the elements of lower temperature-lag, said enclosing means having a temperature-lag characteristic to equalize the temperature conditions of all the elements.

4. An oscillatory system according to claim 3 in which the enclosing means is of a material having low dielectric loss.

5. An oscillatory system according to claim 3 in which the said enclosing means is a ceramic substance.

6. An oscillatory system according to claim 3 in which said enclosing means is of a ceramic substance coated with a metal layer.

HANS JACOBS.